US009648286B2

(12) United States Patent
Yoneji et al.

(10) Patent No.: US 9,648,286 B2
(45) Date of Patent: May 9, 2017

(54) VIDEO MONITORING SYSTEM, VIDEO MONITORING METHOD, AND VIDEO MONITORING SYSTEM BUILDING METHOD

(71) Applicant: Hitachi, Ltd., Chiyoda-ku, Tokyo (JP)

(72) Inventors: Kenichi Yoneji, Tokyo (JP); Tsukasa Yamauchi, Tokyo (JP); Tomoaki Yoshinaga, Tokyo (JP); Daisuke Matsubara, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 317 days.

(21) Appl. No.: 14/471,856

(22) Filed: Aug. 28, 2014

(65) Prior Publication Data

US 2015/0062336 A1 Mar. 5, 2015

(30) Foreign Application Priority Data

Aug. 29, 2013 (JP) .................................. 2013-178524

(51) Int. Cl.
*H04N 7/18* (2006.01)
*G06K 9/00* (2006.01)

(52) U.S. Cl.
CPC ......... *H04N 7/181* (2013.01); *G06K 9/00778* (2013.01); *G06K 9/00993* (2013.01)

(58) Field of Classification Search
None
See application file for complete search history.

(56) References Cited

U.S. PATENT DOCUMENTS

| 2003/0025800 A1* | 2/2003 | Hunter | G08B 13/19608 348/208.13 |
| 2007/0002348 A1* | 1/2007 | Hagiwara | G06F 3/1208 358/1.13 |
| 2008/0270399 A1* | 10/2008 | Feng | G06K 9/00993 |
| 2011/0188701 A1* | 8/2011 | Bobbitt | G06K 9/00771 382/100 |

(Continued)

FOREIGN PATENT DOCUMENTS

| EP | 1 489 847 A2 | 12/2004 | |
| JP | 2007-264706 | * 10/2007 | ......... G06K 9/00993 |
| JP | 2007-264706 A | 10/2007 | |

(Continued)

OTHER PUBLICATIONS

Riccardo Mazzon et al: "Multi-camera tracking using a MultiGoal Social Force Model", Neurocomputing, vol. 100, Jan. 1, 2013 (Jan. 1, 2013), pp. 41-50.*

(Continued)

*Primary Examiner* — Mohammed Rahaman
(74) *Attorney, Agent, or Firm* — Crowell & Moring LLP

(57) ABSTRACT

It is an objective of the present invention to reduce processing loads for video analysis utilizing information throughout the facility. A video monitoring system according to the present invention simulates a flow of a moving object within a video captured by multiple monitoring cameras, calculates a parameter correlated with a processing load for movement analysis of the moving object according to the simulation result, and specifies a processing scheme that is capable of reducing the processing load according to a correspondence relationship between the parameter and the simulation result (refer to FIG. 2).

13 Claims, 15 Drawing Sheets

(56) References Cited

U.S. PATENT DOCUMENTS

2011/0298928 A1   12/2011   Chen et al.

FOREIGN PATENT DOCUMENTS

| WO | WO 98/08208 A2 | 2/1998 |
| WO | WO 2007/026744 A1 | 3/2007 |
| WO | WO 2013/090910 A2 | 6/2013 |
| WO | WO 2013/110780 A1 | 8/2013 |

OTHER PUBLICATIONS

Singapore Partial Search Report dated Feb. 26, 2015 (five pages).
Riccardo Mazzon et al: "Multi-camera tracking using a Multi-Goal Social Force Model", Neurocomputing, vol. 100, Jan. 1, 2013, pp. 1-12, XP055157043, (Twelve (12) pages).
European Search Report dated Dec. 18, 2014 (Three (3) pages).
Dirk Helbing et al., "Social Force Model for Pedestrian Dynamics", Physical Review E, May 1995, pp. 4282-4286, vol. 51, No. 5.
Simon Baker et al., "Lucas-Kanade 20 Years on: a Unifying Framework: Part 1", International Journal of Computer Vision, 2004, pp. 1-47, vol. 53, No. 3.

\* cited by examiner

FIG. 1
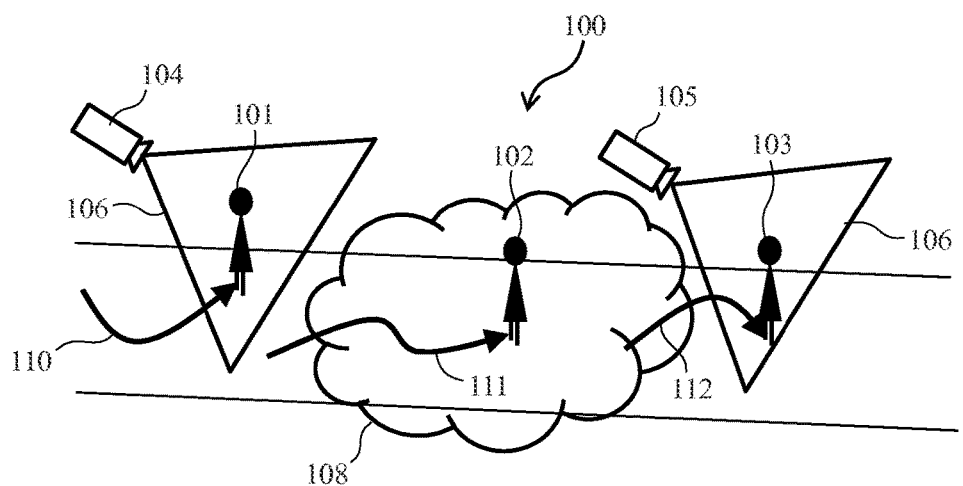
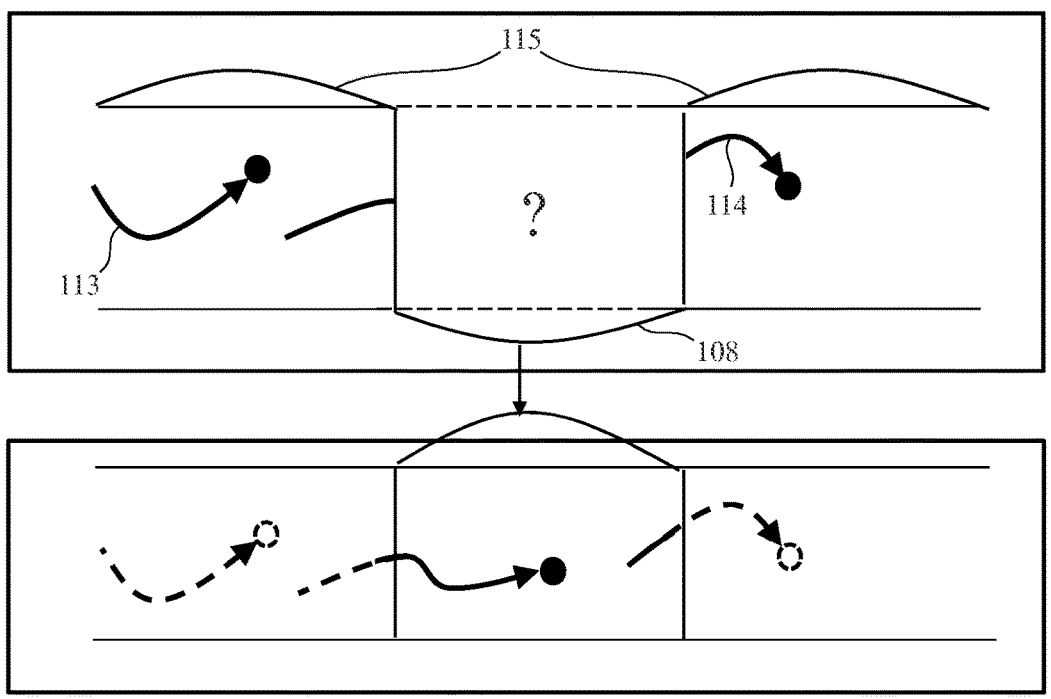

| control signal test pattern | camera A processing load | camera B processing load | camera C processing load | matching degree | ratio of processing load with respect to objective processing load | selected pattern |
|---|---|---|---|---|---|---|
| 1 | 50% | 100% | 50% | 70% | 95% | |
| 2 | 100% | 50% | 50% | 75% | 95% | |
| 3 | 50% | 50% | 100% | 80% | 95% | O |
| 4 | 100% | 100% | 50% | 85% | 145% | |
| 5 | 50% | 100% | 100% | 90% | 145% | |
| 6 | 100% | 50% | 100% | 95% | 145% | |

FIG. 12

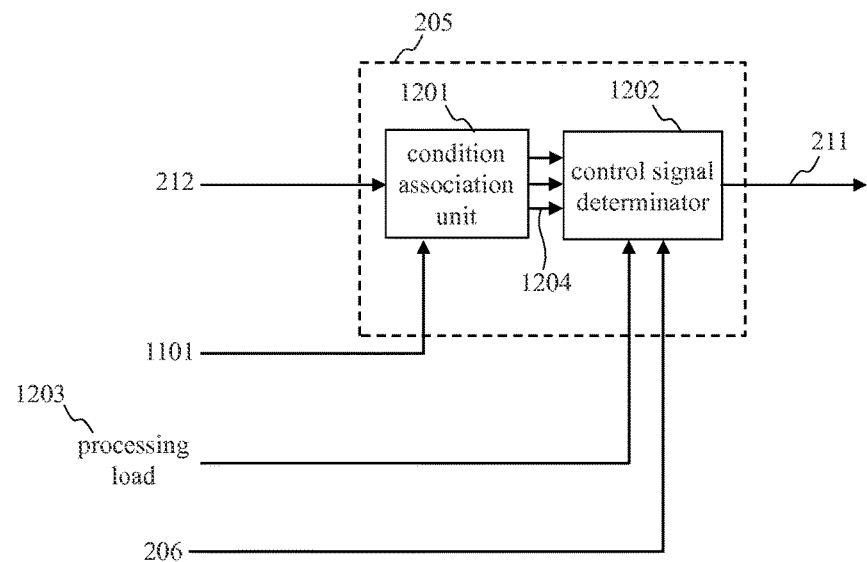

FIG. 13

| configuration pattern | priority | condition | camera A processing load | camera B processing load | camera C processing load |
|---|---|---|---|---|---|
| 1 | 1 | density of monitored objects at point A is 1.0 [number of objects / m²] or below | 50% | 100% | 100% |
| 2 | 2 | density of monitored objects at point B is 0.5 [number of objects / m²] or below | 100% | 50% | 100% |
| 3 | 3 | density of monitored objects at point C is 1.5 [number of objects / m²] or below | 100% | 100% | 50% |
| 4 | 4 | none of above | 25% | 25% | 25% |

VIDEO MONITORING SYSTEM, VIDEO MONITORING METHOD, AND VIDEO MONITORING SYSTEM BUILDING METHOD

CLAIM OF PRIORITY

The present application claims priority from Japanese patent application JP 2013-178524 filed on Aug. 29, 2013, the content of which is hereby incorporated by reference into this application.

BACKGROUND

Technical Field

The present invention relates to a technique for monitoring monitored objects using videos.

Background Art

In recent years, there are increasing needs for identifying human flows in facilities to efficiently detect congestion conditions or occurrence of troubles. Regarding such needs, there is a system that identifies human flows in facilities using monitoring cameras installed in locations where people gather such as stores or airports, thereby detecting congestion conditions or occurrence of troubles. However, in such systems, only the information within the field of view of the monitoring cameras is available. Thus it is difficult to identify the conditions throughout the facility.

Regarding the above-described problem, Patent Document 1 listed below describes a technique that estimates, according to the information acquired from the monitoring cameras, moving paths of persons at blind spots of the cameras. In addition, Patent Document 2 listed below describes, regarding video monitoring, a technique that decreases processing loads by switching analysis processes. Non-Patent Documents 1 and 2 listed below disclose techniques, as techniques regarding video monitoring, that extract movements from videos.

RELATED ART DOCUMENTS

Patent Documents

Patent Document 1: WO 2007/026744
Patent Document 2: JP Patent Publication (Kokai) 2007-264706 A Non-Patent Documents Non-Patent Document 1: Dirk Helbing and Peter Molnar, "Social Force Model for Pedestrian Dynamics", Physical Review E, vol. 51, no. 5, pp. 4282-4286, 1995.
Non-Patent Document 2: S. Baker and I. Matthews, "Lucas-kanade 20 years on: A unifying framework", International Journal of Computer Vision, vol. 53, no. 3, 2004.

SUMMARY

When estimating moving paths of persons, it is necessary to extract information required to estimate the moving paths from the video of monitoring cameras. At this time, there is a technical problem regarding the processing load to extract information that is required to estimate the moving paths from multiple monitoring cameras. For example, a case is assumed where videos of multiple monitoring cameras are aggregated on the same server and information is extracted on the server. In such a case, the processing load on the server becomes higher as the number of monitoring cameras processed by one server is increased. Accordingly, the time span to complete information extraction for all cameras could be longer than the time span to input the camera images. In this case, it is impossible to extract information on a real-time basis. Thus it is impossible to identify the condition of the facility on a real-time basis.

Regarding the above-described problem, in Patent Document 2 above, the processing load for analysis is decreased by determining the congestion level according to the camera images and by switching the analysis process according to the determination result. However, in this technique, the analysis process is switched using the information available from a single camera. Therefore, it is difficult to reduce the processing load utilizing the information throughout the facility.

The present invention is made in order to solve the above-mentioned problem. It is an objective of the present invention to reduce processing loads for video analysis utilizing information throughout the facility.

A video monitoring system according to the present invention simulates a flow of a moving object within a video captured by multiple monitoring cameras, calculates a parameter correlated with a processing load for movement analysis of the moving object according to the simulation result, and specifies a processing scheme that is capable of reducing the processing load according to a correspondence relationship between the parameter and the simulation result.

With the video monitoring system according to the present invention, it is possible to identify a condition throughout the facility by a simulation using multiple cameras, thereby reducing a processing load for video analysis based on the result thereof.

BRIEF DESCRIPTION OF THE DRAWINGS

FIG. 1 is a schematic diagram of a video monitoring system 100 according to an embodiment 1.

FIG. 12 is a functional block diagram showing a configuration example of the control signal generator 205 in the embodiment 2.

FIG. 13 is a diagram showing a configuration and a data example of a configuration pattern correspondence table 1300 included in a condition association unit 1201.

DETAILED DESCRIPTION OF THE EMBODIMENT(S)

Embodiment 1

Figure 2:
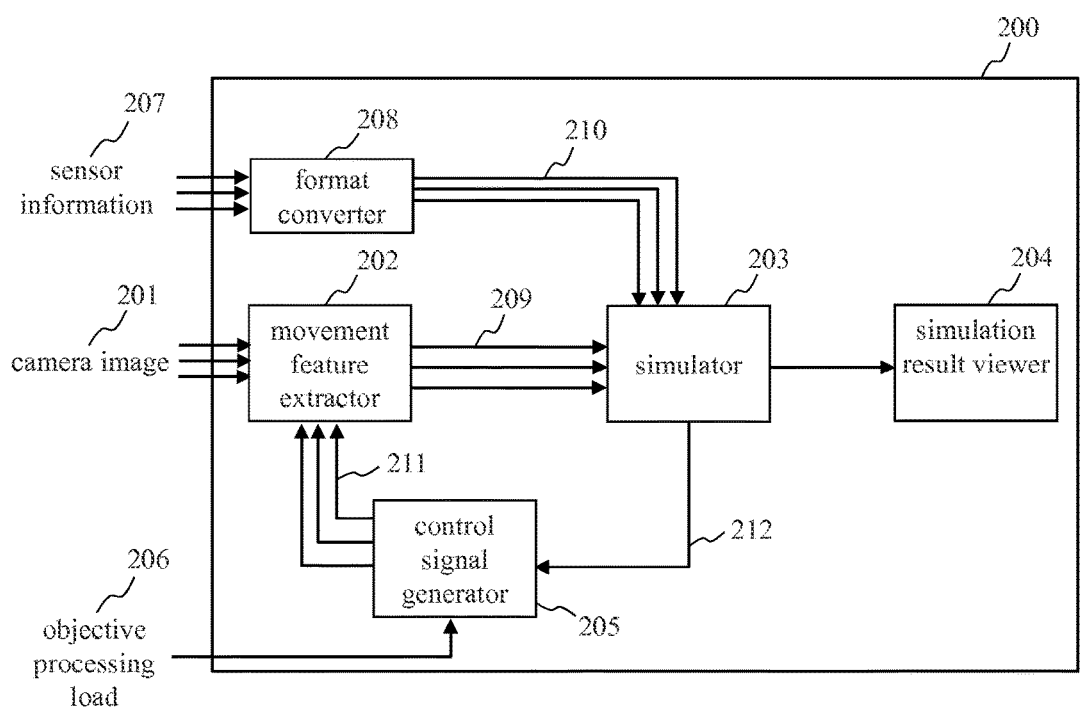
FIG. 2 is a functional diagram of a video monitoring device 200 included in the video monitoring system 100 according to the embodiment 1.

FIG. 1 is a schematic diagram of a video monitoring system 100 according to an embodiment 1 of the present invention. In FIG. 1, monitored objects (movable bodies) (101, 102, 103) existing in a monitored area are monitored by monitoring cameras (104, 105). Each of the monitoring cameras has a limited field of view (106) for capturing videos. Thus there is a blind area 108 that is not monitored by any one of the cameras.

Firstly, the video monitoring system 100 extracts movement features (110, 111, 112) of the monitored object from the video captured by each of the cameras. At this time, the movement features (110, 112) within the field of view of each monitoring camera are extracted by performing image processing with respect to the video of the monitoring camera. The extracted movement features are converted into movement features (113, 114) of overhead view. The movement feature 111 of the blind area cannot be extracted because it is not monitored by the monitoring cameras. Thus only the movement feature within the monitored area 115 is available. The video monitoring system 100 then performs a simulation using the acquired movement features to estimate movement features of the object throughout the facility. This enables acquiring movement features of monitored objects throughout the facility.

In the embodiment 1, as an example of estimating movement features of monitored objects throughout the facility, a method will be described in which movement features are more precisely estimated than Patent Document 1 by simulating flows of monitored objects using information acquired from sensors in addition to information acquired from videos of monitoring cameras. Examples of information available from sensors may be such as, counted results for passing number of monitored objects by infrared sensors, or estimated results for number of monitored objects by load sensors. When performing the simulations, methods such as described in Non-Patent Document 1 are used to estimate the movement model of monitored objects, and the movement directions of the monitored objects are simulated according to the movement models. This enables estimating the flows of monitored objects more particularly than Patent Document 1.

FIG. 2 is a functional diagram of a video monitoring device 200 included in the video monitoring system 100 according to the embodiment 1. The video monitoring device 200 includes a movement feature extractor 202, a simulator 203, a simulation result viewer 204, a control signal generator 205, and a format converter 208.

The movement feature extractor 202 receives a camera image 201 captured by each of multiple monitoring cameras. The movement feature extractor 202 extracts a movement feature 209 from each of the camera images 201. The movement feature is information describing movement paths of moving objects captured in monitoring camera images. For example, the movement feature is described by vectors in which coordinate locations of moving objects are aligned for each of time. According to a control signal 211 given from the control signal generator 205, the movement feature extractor 202 switches processing schemes that are used when extracting movement features. Details of the switching will be described later. The extracted movement feature 209 is inputted into the simulator 203.

The format converter 208 receives sensor information 207 describing physical states detected by each sensor. The format converter 208 converts the sensor information 207 into formats that can be handled by the simulator 203. For example, if the sensor information 207 describes counted results for the number of monitored objects by infrared sensors, location information of the sensor is attached to the counted result of monitored objects, and then outputted. The sensor information 207 in which the format converter 208 converts its format is referred to as sensor feature 210.

The simulator 203 receives the movement feature 209 and the sensor feature 210. The simulator 203 performs a simulation using the movement feature 209 and the sensor feature 210 to calculate movement features of monitored objects throughout the facility. The movement feature of monitored objects throughout the facility acquired by this simulation is referred to as a simulation result 212. The simulation result 212 is inputted into the simulation result viewer 204 and the control signal generator 205.

The simulation result viewer 204 performs processes such as projecting the simulation result 212 onto the map of the facility, and displays it on such as displays.

The control signal generator 205 receives the simulation result 212 and an objective processing load 206. The control signal generator 205 generates the control signal 211 for switching the processing scheme used when the movement feature extractor 202 extracts the movement feature 209. The control signal generator 205 then outputs the control signal 211 into the movement feature extractor 202. The control signal generator 205 generates the control signal 211 so that the processing load of the video monitoring device 200 will be decreased. By generating the control signal 211 reducing the processing load according to the simulation result 212, the analysis process is planned to be completed on a real time basis. By generating the control signal 211 according to the simulation result 212 that is generated using the camera image 201 acquired from multiple cameras, it is possible to adjust the processing load in the light of the condition throughout the facility. Therefore, it is possible to perform a control more preferable than adjusting the processing load using a video acquired from a single camera.

In the embodiment 1, the control signal is generated so that the processing load of the process extracting movement features for all monitoring cameras is restricted within the objective processing load 206. If an objective is to acquire the simulation result on a real time basis, the objective processing load 206 may be configured so that the process of extracting features for all cameras will be completed within the time interval at which the videos are inputted from the cameras. The objective processing load 206 may be configured as a reference of processing duration required for completing the calculation, for example.

Figure 3:
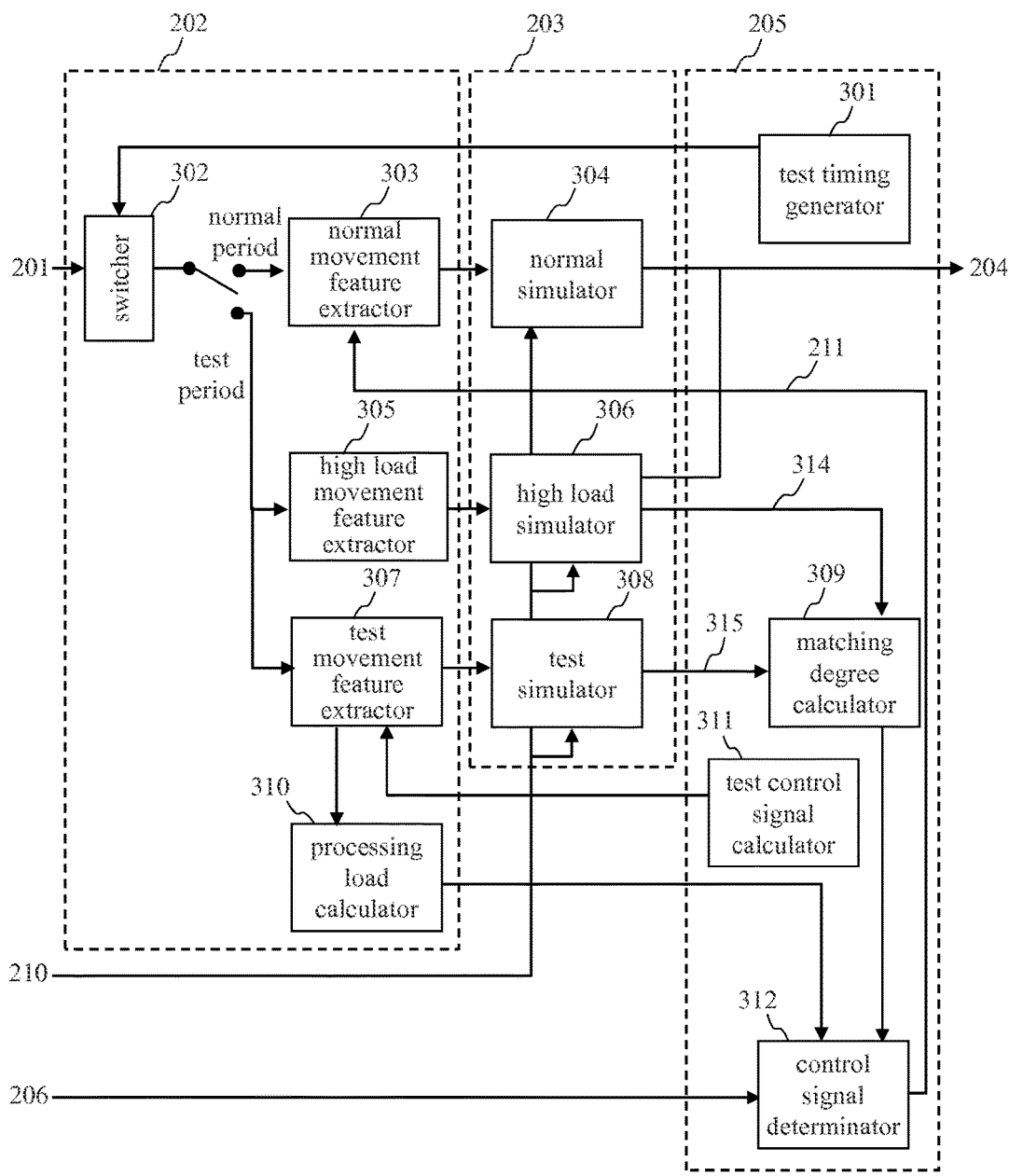
FIG. 3 is a functional block diagram showing a configuration example of a movement feature extractor 202, a simulator 203, and a control signal generator 205.

FIG. 3 is a functional block diagram showing a configuration example of the movement feature extractor 202, the simulator 203, and the control signal generator 205. During operations, these functional units switch between a test period for performing simulations using the camera image 201 in order to determine the control signal 211 and a normal period for extracting movement features according to the determined control signal 211.

The movement feature extractor 202 includes a switcher 302, a normal movement feature extractor 303, a high load movement feature extractor 305, a test movement feature extractor 307, and a processing load calculator 310. The simulator 203 includes a normal simulator 304, a high load simulator 306, and a test simulator 308. The control signal generator 205 includes a test timing generator 301, a matching degree calculator 309, a test control signal generator 311, and a control signal determinator 312.

The test timing generator 301 generates a timing for switching between the test period and the normal period, and outputs a signal for the switching. Examples of timing for switching will be described with FIG. 4 later.

The switcher 302 switches between the test period and the normal period according to the switching signal inputted from the test timing generator 301. If the switching signal generated by the test timing generator 301 indicates the normal period, the normal simulator 304 performs a simulation and outputs the acquired simulation result into the simulation result viewer 204. If the switching signal generated by the test timing generator 301 indicates the test period, the camera image 201 is inputted into the high load movement feature extractor 305 and into the test movement feature extractor 307. Processes of these extractors will be described later.

The high load movement feature extractor 305 extracts movement features using parameters that cause the highest processing load among configurable parameters. The extracted movement feature is inputted into the high load simulator 306. The high load simulator 306 performs a simulation using the received movement features and outputs the simulation result. The simulation result acquired by this process is a result of a simulation using features acquired from the high load feature extraction process. Thus it can be assumed that such simulation result has a high precision. Hereinafter, this simulation result will be referred to as a high precision simulation result 314. The high precision simulation result 314 is inputted into the matching degree calculator 309.

The test control signal generator 311 sequentially selects control signal patterns described by a test pattern generation table 500 exemplified with FIG. 5 later, and generates control signals for tests according to those patterns.

The test movement feature extractor 307 extracts features according to the control signal for tests generated by the test control signal generator 311. The extracted movement feature is inputted into the test simulator 308. The test simulator 308 performs a simulation using the received movement feature, and outputs the simulation result. This acquires a simulation result corresponding to the control signal for tests. This simulation result will be referred to as a test simulation result 315. The test simulation result 315 is inputted into the matching degree calculator 309.

The processing load calculator 310 calculates processing loads when the test movement feature extractor 307 extracts movement features according to the control signal for tests. The calculated processing load is inputted into the control signal determinator 312.

The matching degree calculator 309 calculates a matching degree between the high precision simulation result 314 and the test simulation results 315 corresponding to each of the control signals for tests. The matching degree may be calculated by, for example, comparing a matching degree between a histogram in the moving direction of monitored objects in the high precision simulation result 314 at a certain time and a histogram in the moving direction of monitored objects in the test simulation result 315 at the same time, using such as Bhattacharyya distance. The higher the matching degree is, the more precise the test simulation result 315 is. The calculated matching degree is inputted into the control signal determinator 312.

The control signal determinator 312 determines the preferable control signal 211 using the matching degree corresponding to each of the control signals for tests and the processing load when extracting features. The sequence for determination will be described using FIG. 5 later. The normal movement feature extractor 303 extracts movement features according to the control signal 211 determined by the control signal determinator 312. This acquires simulation results with high precision on a real time basis while reducing processing loads.

Figures 4, 5:
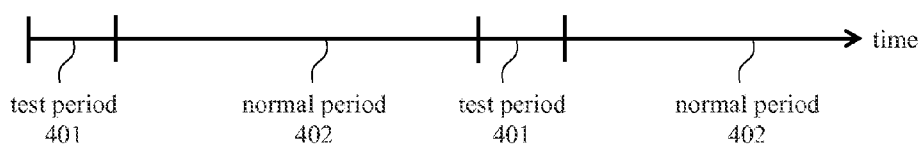
FIG. 4 is a diagram exemplifying a timing for a switcher 302 to switch between a test period and a normal period.
FIG. 5 is a diagram showing a configuration and a data example of a test pattern generation table 500 stored in a test control signal generator 311.

FIG. 4 is a diagram exemplifying a timing for the switcher 302 to switch between the test period and the normal period. The video monitoring system 100 performs a test for configuring the control signal 211 during the test period 401 according to the above-described sequence, and works during the normal period 402 using the control signal 211. The switcher 302 generates switching signals so that the test period 401 and the normal period 402 are repeated.

FIG. 5 is a diagram showing a configuration and a data example of the test pattern generation table 500 stored in the test control signal generator 311. The test pattern generation table 500 is data describing combination patterns of the camera images 201 to which processing schemes for reducing processing loads when extracting movement features are applied. For example, the test pattern of the first line in FIG. 5 shows that: regarding the camera image 201 acquired from camera A and camera C, a processing scheme is applied that uses a parameter among configurable parameters causing a processing load which is 50% of the processing scheme using the highest processing load. For the sake of convenience of description, FIG. 5 also shows processing results acquired by using test patterns described by the test pattern generation table 500.

"matching degree" shown in FIG. 5 is a matching degree between the test simulation result 315 corresponding to each of the test patterns and the high precision simulation result 314. It can be supposed that as the processing load used by the processing scheme becomes higher, the matching degree also becomes higher. Thus the matching degree has a correlation with the processing loads of each of the movement feature extractors. "ratio of processing load with respect to objective processing load" shown in FIG. 5 shows ratios of each test pattern with respect to the objective processing load 206. If this value is at or below 100%, it shows that the objective processing load 206 is achieved (e.g. the process is completed on a real time basis). If there are multiple test patterns achieving the objective processing load 206, the control signal determinator 312 determines the control signal 211 among them achieving the highest matching degree.

In the above-described sequence, the processing load during the test period 401 may increase to disable real-time processing. Even in such cases, the simulation result viewer 204 can show some degree of information by presenting the high precision simulation result 314, though it includes some delay from the real time simulation result. In addition, overall processing loads can be decreased by securing the normal period 402 sufficiently longer than the test period 401.

In the above-described sequence, the control signal determinator 312 selects a test pattern with the highest matching degree among the test patterns below the objective processing load 206. It is also possible to select a test pattern as the control signal 211 with the lowest processing load among the test pattern achieving the objective matching degree.

In the timing example shown in FIG. 4, the test timing generator 301 switches between the test period 401 and the normal period 402 at a constant interval. It is also possible to measure the processing load in the normal period 402 in advance, and to perform the switching into the test period 401 when the processing load excesses a predetermined value.

In the above-described configuration example, it is possible to record the camera image 201 and to extract movement features based on the recorded video. In this case, the high load movement feature extractor 305 and the test movement feature extractor 307 may perform processing at different timings using the same video. By shifting the timings at which the high load movement feature extractor 305 and the test movement feature extractor 307 perform processes from each other, it is possible to restrict temporary increase in processing load during the test period 401.

Figure 6:
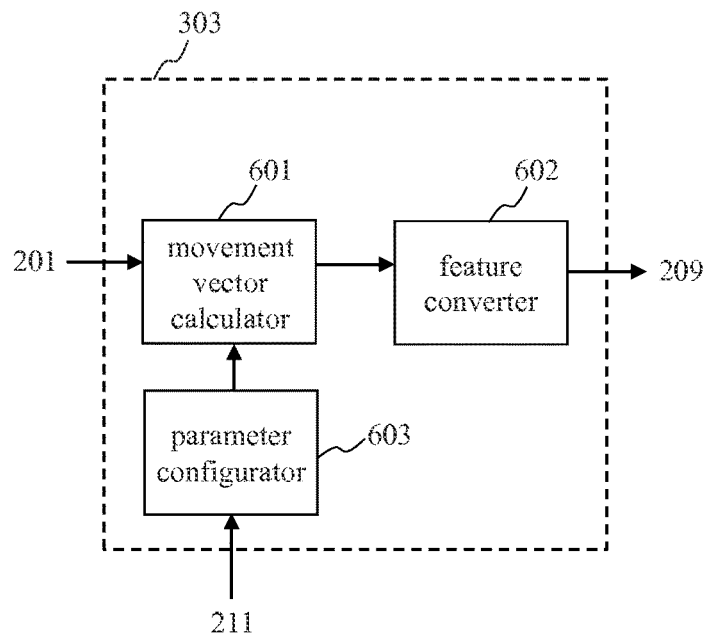
FIG. 6 is a functional block diagram showing a configuration example of a normal movement feature extractor 303.

FIG. 6 is a functional block diagram showing a configuration example of the normal movement feature extractor 303. The high load movement feature extractor 305 and the test movement feature extractor 307 also include similar configurations. The camera image 201 is inputted into a movement vector calculator 601. The movement vector calculator 601 extracts movement vectors from the camera image 201 using, for example, the scheme described in Non-Patent Document 2. The extracted movement vector is inputted into a feature converter 602. The feature converter 602 converts the movement feature extracted by the movement vector calculator 601 into the movement feature 209 in which simulations can be performed. The control signal 211 for configuring parameters used by the movement vector calculator 601 is inputted into a parameter configurator 603. According to the control signal 211, the parameter configurator 603 changes processing parameters used by the movement vector calculator 601 when extracting the movement vectors. This parameter is a parameter that influences on the processing load of the movement vector calculator 601. For example, this parameter is a parameter that specifies a processing frequency for calculating the movement vector or that specifies areas for the processing. If the control signal 211 instructs to decrease the processing load for calculating the movement vector by 50%, the processing frequency parameter is reduced to half, so that the feature is extracted once every two times the camera image is inputted. This reduces the processing load by 50%. The parameter configurator 603 stores a correspondence table between the control signal 211 and the processing parameters in advance, and converts the control signal 211 into parameters of feature extraction process using the correspondence table. The movement vector calculator 601 calculates movement vectors using the parameters.

Figure 7:
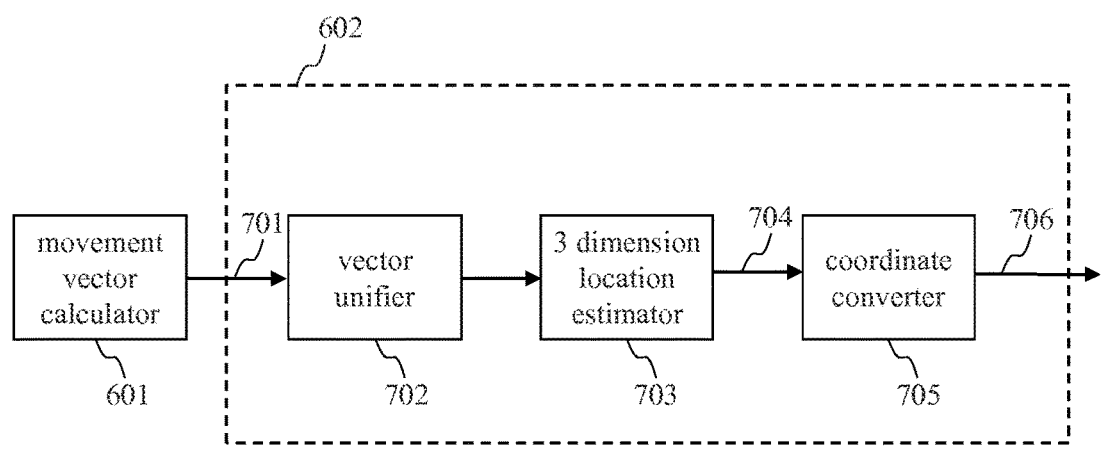
FIG. 7 is a functional block diagram showing a configuration example of a feature converter 602.

FIG. 7 is a functional block diagram showing a configuration example of the feature converter 602. The example shows that a movement vector 701 extracted by the movement calculator 601 is described by a 2 dimension movement vector corresponding to image coordinates. The simulator 203 uses movement features seen from an overhead view as the movement features of monitored objects. The feature converter 602 includes a vector unifier 702, a 3 dimension location estimator 703, and a coordinate converter 705.

The feature includes a 2 dimension location on the image coordinate and a movement feature describing movements. The vector unifier 702 unifies these vectors assuming that adjacent vectors among the movement vectors 701 are highly likely to be vectors of the same object. For example, commonly known Mean-Shift clustering technique may be used to unify the vectors. The 3 dimension location estimator 703 converts the 2 dimension location on the image coordinate where the feature has been extracted into a 3 dimension location in the real space. This conversion can be easily performed if the angle of field of cameras, the focal length, the height from the ground, the angle of the camera with respect to the ground, and the height of the feature in the real space are known. The angle of view of cameras, the focal length, the height from the ground, and the angle of the camera with respect to the ground are configured in advance. The height of feature extraction point in the real space can be estimated by such as the method below.

The height of feature in the real space can be estimated using the relationship between the monitored object and the ground, for example. If humans are monitored objects, human regions are extracted using human extracting process. Assuming that the extracted human is standing on the ground, the height of the human's foot matches with the height of the ground. By assuming that the body height of the extracted human is a certain value, it is possible to estimate the height of features included in the human region. Template matching or the like may be used as the human extracting process. The 3 dimension location estimator 703 performs the above-described process with respect to each of elements in the 2 dimension movement vector of the feature, thereby converting the feature into the 3 dimension movement vector 704.

The coordinate converter 705 performs coordinate translation from camera coordinate into overhead view coordinate. In other words, the 3 dimension movement vector 704 converted into 3 dimension location is converted into the 2 dimensional movement vector 706 seen from overhead viewpoints. The aforementioned process can convert the feature of the movement vector 701 into features seen from overhead viewpoints.

Figure 8:
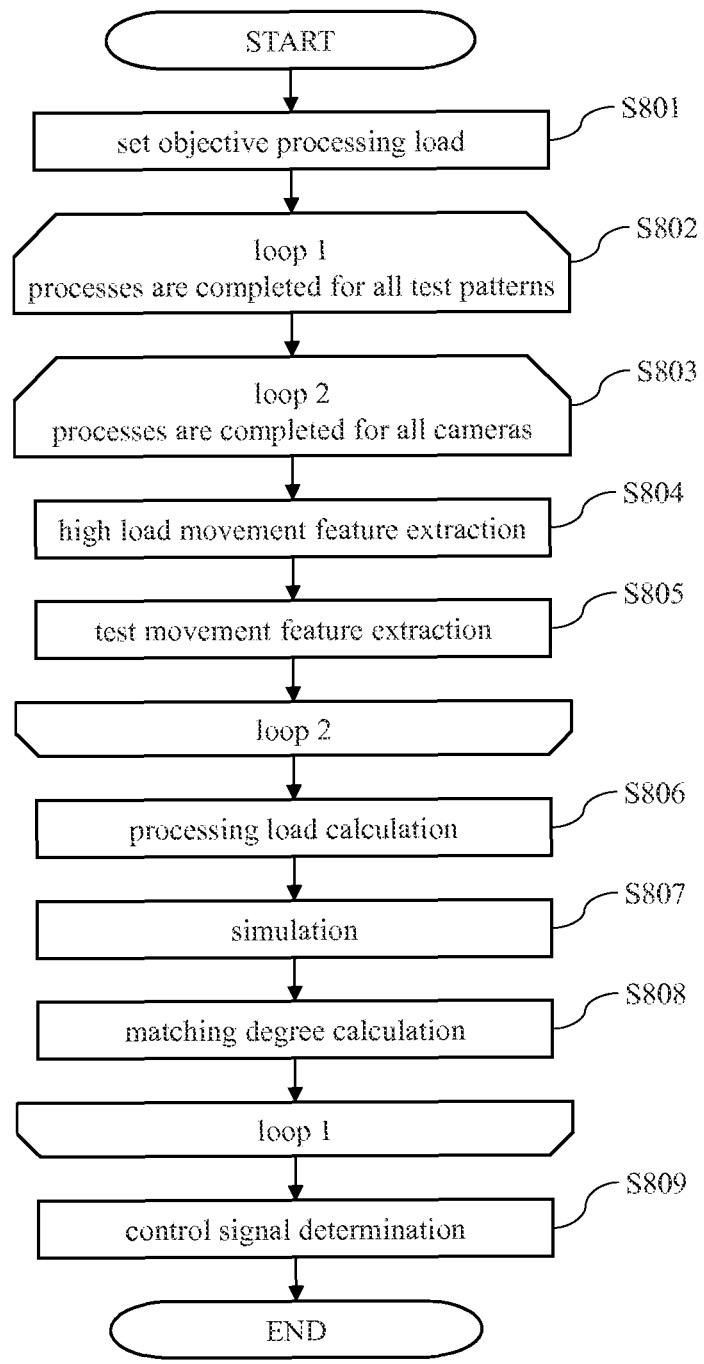
FIG. 8 is a flowchart of a process for determining a control signal 211 in a test period 401.

FIG. 8 is a flowchart of a process for determining the control signal 211 in the test period 401. Hereinafter, each step in FIG. 8 will be described.

(FIG. 8: Step S801)

The control signal generator 205 sets the objective processing load 206. The objective processing load 206 may be, for example, specified by a user of the video monitoring system 100, or may be acquired through appropriate communication networks or storage media.

(FIG. 8: Steps S802-S803)

The video monitoring system 100 performs steps S803-S808 below with respect to all test patterns described in the test pattern generation table 500 (S802). The video monitoring system 100 further performs steps S804-S805 below with respect to all cameras (S803).

(FIG. 8: Steps S804-S805)

The high load movement feature extractor 305 extracts movement features from the camera image 201 using the parameter causing the highest load (S804). The test movement feature extractor 307 extracts movement features from the camera image 201 according to each test pattern described by the test pattern generation table 500 (S805).

(FIG. 8: Steps S806-S808)

The processing load calculator 310 calculates the processing load when the test movement feature extractor 307 extracts movement features (S806). The simulator 203 calculates the simulation results of the high load simulator 306 and the test simulator 308 respectively (S807). The matching degree calculator 309 calculates the matching degree between the high load simulation result and the test simulation result (S808).

(FIG. 8: Step S809)

The control signal determinator 312 determines the control signal 211 on the basis of the processing load calculated in step S806 and of the matching degree calculated in step S808 according to the sequence described in FIG. 5.

Figure 9:
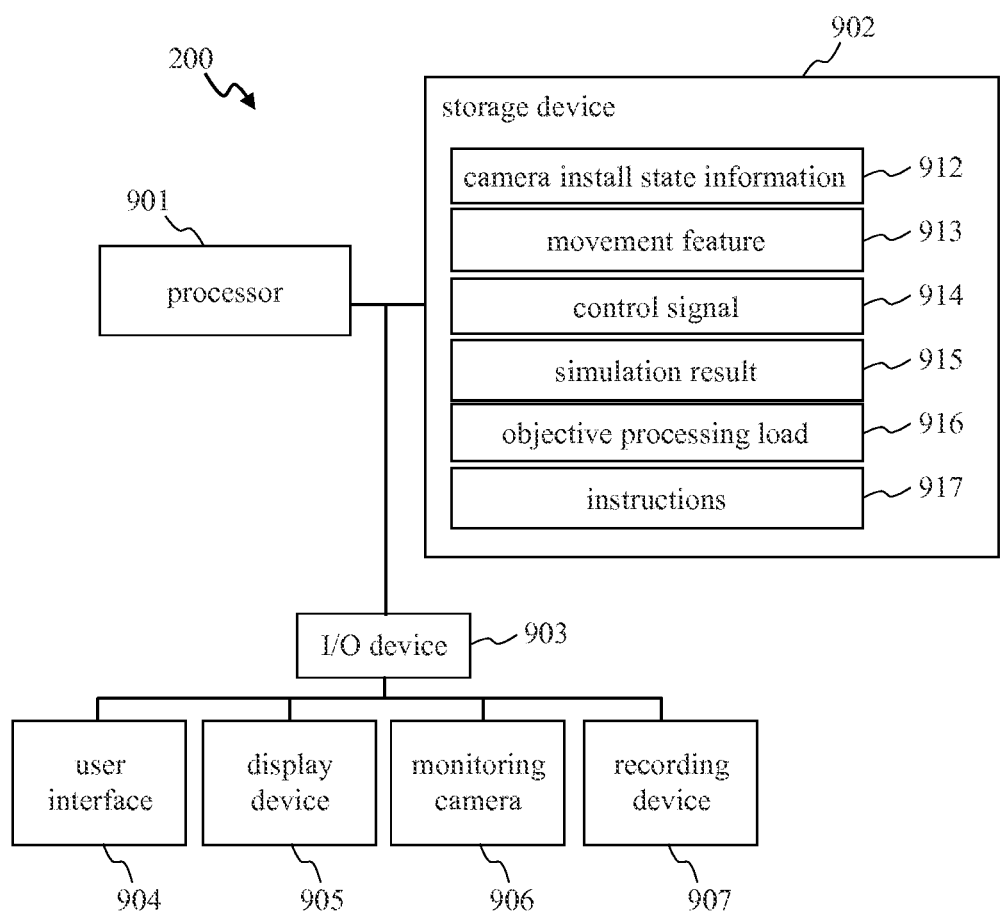
FIG. 9 is a diagram showing a hardware configuration example of the video monitoring device 200.

FIG. 9 is a diagram showing a hardware configuration example of the video monitoring device 200. The video monitoring device 200 includes a processor 901, a storage device 902, and an I/O device 903. The processor 901 and the storage device 902 are connected to a user interface 904, a display device 905, a monitoring camera 906, and a recording device 907 through the I/O device 903.

The processor 901 calls and executes necessary processes from instructions 917 stored in the storage device 902. The instructions 917 are programs describing processes corresponding to the movement feature extractor 202, the simulator 203, the control signal generator 205, and the simulation result viewer 204.

Camera install state information 912 describes configuration parameters of cameras that are used when extracting movement features from the camera image 201. An objective processing load 916 corresponds to the objective processing load 206. These pieces of data are inputted through the user interface 904, and are stored in the storage device 902. A control signal 914 corresponds to the control signal 211 stored in the storage device 902.

The movement feature extractor 202 acquires the camera image 201 captured by the monitoring camera 906 or the camera image 201 recorded by the recording device 907, reads out the camera install state information 912 and the control signal 914 from the storage device 902, and extracts the movement feature 913 using them to store it in the storage device 902. The simulator 203 reads out the movement feature 913, performs a simulation, and store a simulation result as the simulation result 915 in the storage device 902. The control signal generator 205 reads out the simulation result 915 and the objective processing load 916, and generates the control signal 914 using them. The simulation result viewer 204 reads out the simulation result 915, and converts it into video formats that can be displayed on the display device 905. The display device 905 displays the video.

In the configuration example shown in FIG. 9, other data required for performing simulations may be stored in the storage device 902. For example, map information of facilities required for simulation, time information or weather information for performing detailed simulations, and the like may be stored.

Figure 10:
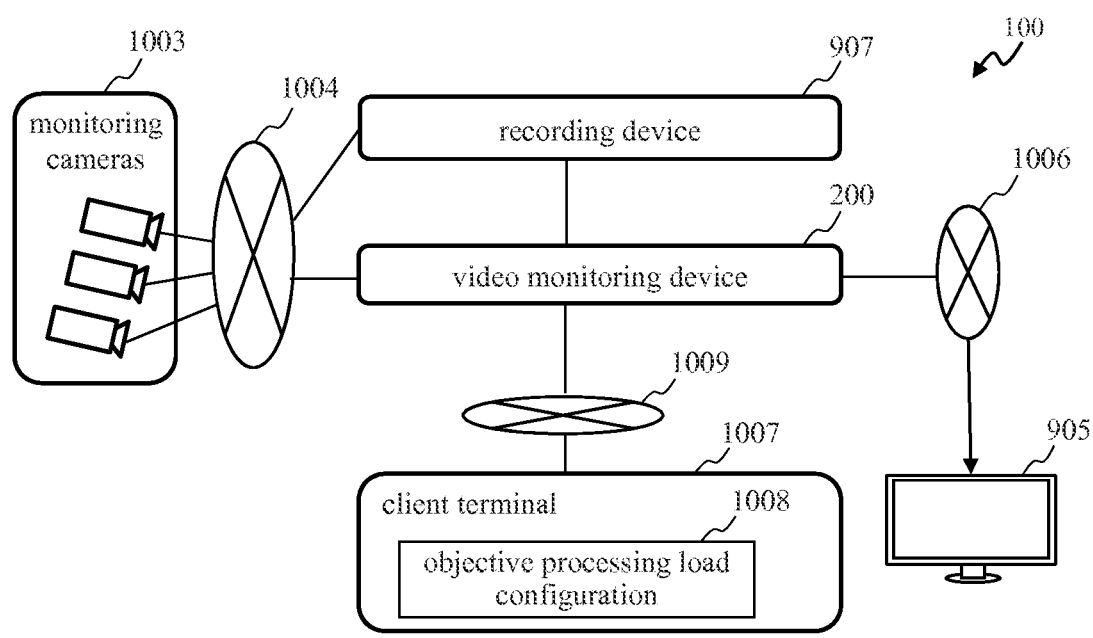
FIG. 10 is a diagram showing a network configuration example of the video monitoring system 100.

FIG. 10 is a diagram showing a network configuration example of the video monitoring system 100. In FIG. 10, monitoring cameras 1003 are connected to the video monitoring device 200 and the recording device 907 through a network 1004. The display device 905 is connected to the video monitoring device 200 through a network 1006. A client terminal 1007 includes the user interface 904 for inputting the objective processing load 916, and is connected to the video monitoring device 200 through a network 1009. Videos from the monitoring cameras 1003 and the recording device 907 are inputted into the video monitoring device 200 through the network 1004. The objective processing load 916 configured by the client terminal 1007 is inputted into the video monitoring device 200 through the network 1009. The simulation result 915 calculated by the video monitoring device 200 is inputted into the display device 905 through the network 1006. The display device 905 displays the result.

In FIGS. 9 and 10, it is assumed that the video monitoring device 200 extracts movement features from the camera image 201. Each of cameras in the monitoring cameras 1003 may perform it. In addition, it is assumed that the client terminal 1007 performs the objective processing load configuring process 1008. The process may be performed by directly connecting I/O terminals to the video monitoring device 200.

In FIGS. 9 and 10, when storing the movement feature 913, not only vector data describing the movement features but also camera configuration parameters or processing parameters used in movement analysis may be stored. In addition, the processing scheme of the simulator 203 may be switched using this information.

In the embodiment 1, the simulator 203 performs simulations using the sensor information 207. If it is possible to execute simulations with sufficient precision even without the sensor information 207, it is not necessary to use the sensor information 207.

Embodiment 1: Summary

As discussed thus far, the monitoring system 100 according to the embodiment 1 employs, as the control signal 211, a test pattern that is the closest to the high precision simulation result 314 among test patterns corresponding to each of the test simulation result 315. Since each simulation result is acquired using multiple of the camera images 201, it is possible to determine the control signal 211 considering conditions throughout the facility. This enables completing the feature extraction for all cameras on a real time basis, and acquiring the simulation result on a real time basis. In addition, even if the processor 901 has a sufficient processing performance, it is possible to decrease the usage rate of the processor 901 to reduce electric power consumption of the overall system by decreasing the processing load using the embodiment 1.

Embodiment 2

In the embodiment 1, a configuration example is described where the control signal 211 is selected from the test patterns described in the test pattern generation table 500. In an embodiment 2 of the present invention, a configuration example will be described where movements of monitored objects are predicted by simulation, the processing load for extracting the movement features is adjusted according to the predicted movement, and the analysis accuracy is optimized according to the movements of monitored objects. Other configurations are approximately the same as the embodiment 1. Thus hereinafter differences will be mainly described.

Figure 11:
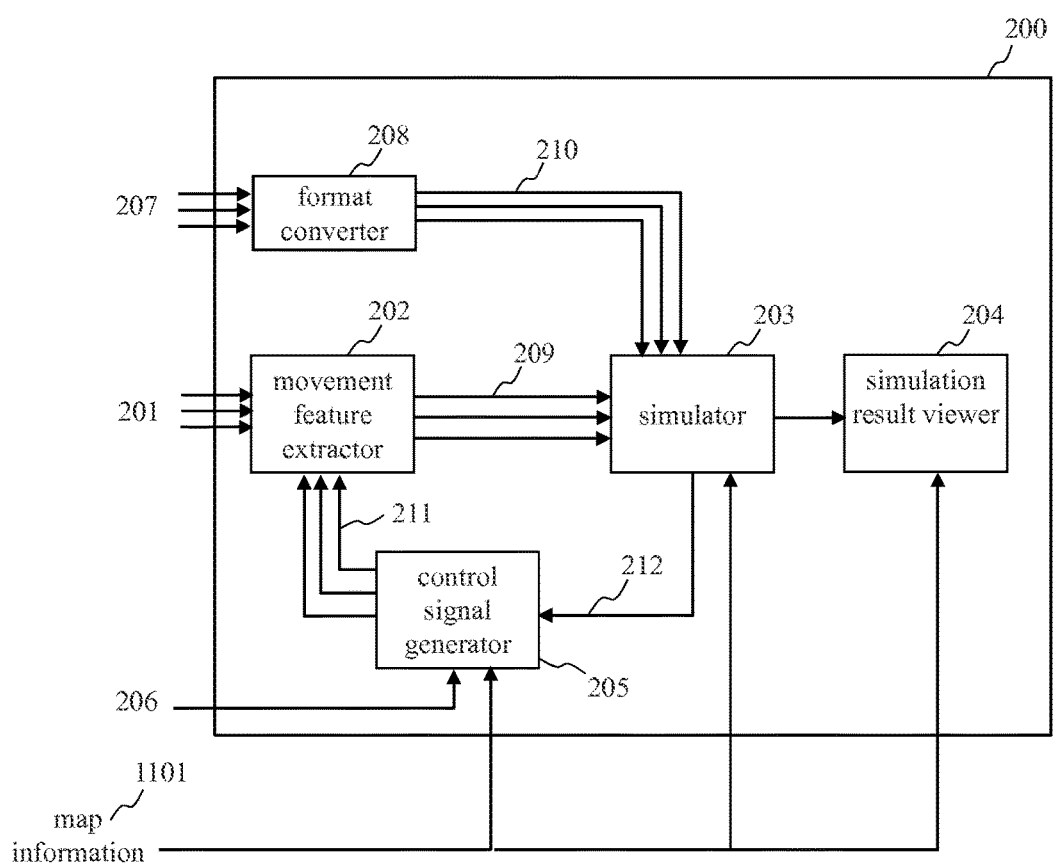
FIG. 11 is a functional block diagram of the video monitoring device 200 according to an embodiment 2.

FIG. 11 is a functional block diagram of the video monitoring device 200 according to the embodiment 2. In the embodiment 2, map information 1101 is used to identify camera locations corresponding to movements of monitored objects. The map information 1101 is information showing layouts of the facility where the video monitoring system 100 is installed. The map information 1101 describes sizes/locations/types of objects disposed in the facility by coordinate values and attribute values in a common coordinate system. Install locations or install states of cameras may be managed in the map information 1101. The map information 1101 is stored in the storage device 902 in advance, for example.

The simulator 203, the simulation result viewer 204, and the control signal generator 205 acquire the map information 1101. The simulator 203 performs simulations using the map information 1101 in addition to the movement feature 209 and the sensor feature 210. For example, if the map information 1101 includes information of walls, the location of walls is designated as simulation conditions. This enables precisely simulating the flows of monitored objects. The simulation result viewer 204 superimposes the simulation result on a visualized result of the layout information included in the map information 1101. This enables plainly present the simulation result. The method by which the control signal generator 205 uses the map information 1101 will be described later.

FIG. 12 is a functional block diagram showing a configuration example of the control signal generator 205 in the embodiment 2. The control signal generator 205 includes, in addition to or instead of the configuration described in the embodiment 1, a condition association unit 1201 and a control signal determinator 1202.

The simulation result 212 and the map information 1101 are inputted into the condition association unit 1201. The condition association unit 1201 associates, using the map information 1101, the simulation result 212 with configuration patterns described later. Details will be described later.

A configuration pattern 1204, a processing load 1203 when the movement feature extractor 202 extracts the movement features, and the objective processing load 206 are inputted into the control signal determinator 1202. The control signal determinator 1202 determines the control signal 211 using the configuration pattern 1204 and the processing load 1203. Details will be described later.

FIG. 13 is a diagram showing a configuration and a data example of a configuration pattern correspondence table 1300 included in the condition association unit 1201. The configuration pattern correspondence table 1300 describes multiple configuration patterns that are determined by combinations of density of monitored objects at certain points on the map information 1101 and the processing loads of each camera. Priorities are set for each of configuration patterns. According to the movement of monitored object acquired from the simulation result 212 and the map information 1101, the condition association unit 1201 calculates densities of monitored objects at points specified by each of the configuration patterns, selects all configuration patterns corresponding to the calculation result, and inputs the selected configuration patterns into the control signal determinator 1202 as the configuration pattern 1204.

If the density of monitored objects at a point A is at or below a predetermined value, it can be assumed that decreasing the analysis accuracy does not significantly influence on the simulation result regarding a camera A capturing the point A. Thus in the configuration pattern 1 in FIG. 13, the movement extraction process load of the camera A is decreased down to 50%. It can be identified according to the map information 1101 that the camera A is shooting the point A. If it is impossible to decrease the overall processing load below the objective processing load 206 only by applying a single configuration pattern, processing loads of other cameras will be decreased according to the sequence below.

Firstly, the control signal determinator 1202 sets a configuration pattern having the highest priority as the control signal 211. The processing load calculator 310 measures the processing load 1203 according to this configuration pattern. If the measured processing load 1203 is below the objective processing load 206, this is determined as the control signal 211. If the processing load 1203 is higher than the objective processing load 206, and if there is a camera with a processing load lower than the current control signal 211 among configuration patterns having the next highest priority, a new control signal 211 is generated using the processing load in the configuration pattern having the next highest priority for that camera. In the data example shown in FIG. 13, the processing load of camera B in the configuration pattern 2 is lower than the processing load of camera B in the configuration pattern 1. Thus the configuration pattern 2 is employed for camera B. As a result, the control signal 211 is: camera A=50%, camera B=50%, and camera C=100%. The control signal determinator 1202 repeats the same sequence until the processing load 1203 becomes below the objective processing load 206 or all configuration patterns are combined.

The processing load 1203 may not become below the objective processing load 206 even by combining all configuration patterns. In such cases, a predetermined configuration pattern that surely achieves the objective processing load 206 may be prepared in advance, such as the configuration pattern 4 shown in FIG. 13, and such configuration pattern can be employed as the control signal 211. It is not necessary to decrease the processing loads for all cameras. It is sufficient to decrease the processing load of each of movement feature extractors totally.

The configuration pattern correspondence table 1300 may be created according to the processing load 1203 that is measured using such as recorded videos in advance. For example, an experiment is performed to calculate movement features of recorded videos, configuration patterns are determined that do not deteriorate accuracy of simulation results even with reduced processing loads, and such configuration patterns may be described in the configuration pattern correspondence table 1300.

If the density of monitored objects becomes higher, the processing loads of each movement feature extractor may also become higher. In other words, "condition" in the configuration pattern correspondence table 1300 has a correlation with the processing load of each movement feature extractor. Parameters such as moving speed or complexity of movement other than density of monitored objects may have similar roles. Thus these parameters may be used instead of the density.

Embodiment 2: Summary

As discussed thus far, the video monitoring system 100 according to the embodiment 2 can adjust the processing load for extracting movement features in accordance with the movement of monitored objects, by associating the simulation result 212 with the configuration patterns. This eliminates needs for the test period 401 for determining the control signal 211, thereby acquiring simulation results while maintaining a constant processing load.

In the example shown in FIG. 13, if the density of monitored objects at point A is decreased, it is assumed that the processing load of camera A for shooting point A may also be reduced. As another operational example, the destination of monitored object may be predicted by simulation, thereby previously reducing the processing load of the camera at the destination according to the prediction result.

Embodiment 3

Figure 14:
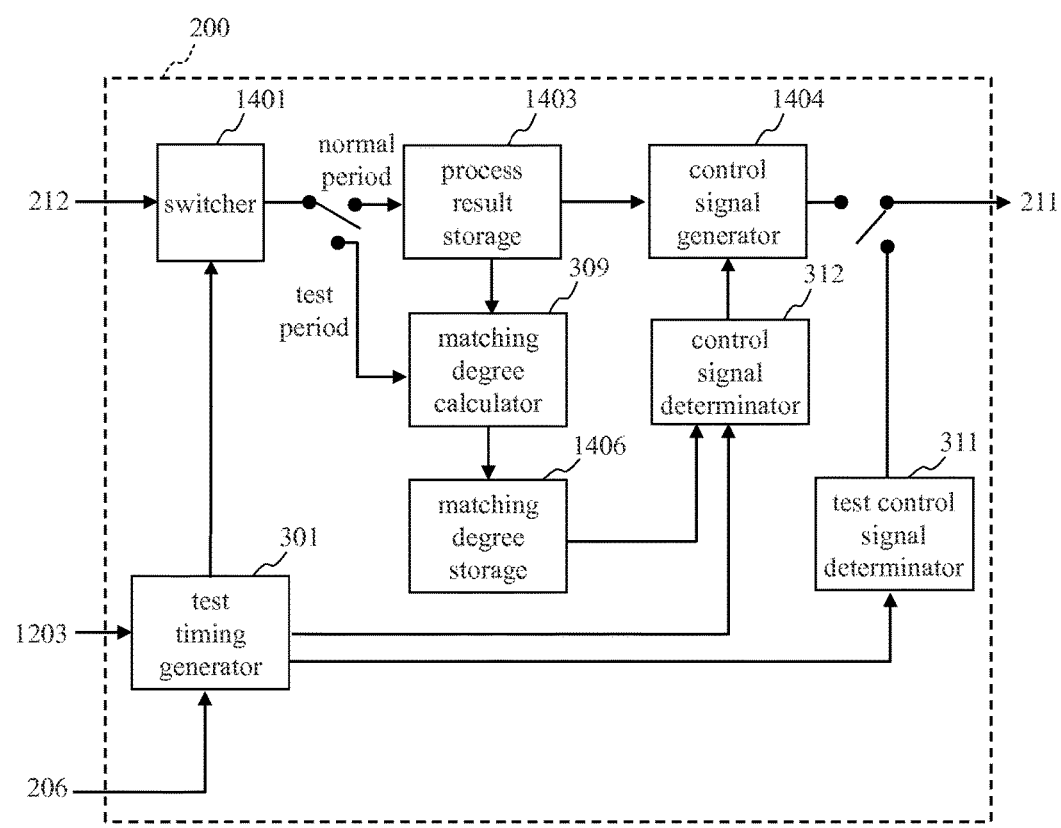
FIG. 14 is a functional block diagram of the video monitoring device 200 according to an embodiment 3.

FIG. 14 is a functional block diagram of the video monitoring device 200 according to an embodiment 3 of the present invention. In the embodiment 3, under the configuration described in the embodiment 1, a configuration example will be described where the processing load is gradually adjusted while switching between the normal period 402 and the test period 401. Other configurations are similar to those of the embodiment 1. Thus hereinafter differences will be mainly described.

In the embodiment 3, the control signal generator 205 includes a switcher 1401, a process result storage 1403, a control signal generator 1404, and a matching degree storage 1406. Other functional units are the same as those of the embodiment 1. Hereinafter, each of the functional units and their cooperation will be described.

The switching signal generated by the test timing generator 301 is inputted into the switcher 1401. If the switching signal indicates the normal period 402, the process in the normal period 402 is performed. If the switching signal indicates the test period 401, the process in the test period 401 is performed.

In the normal period 402, the simulation result 212 is inputted into the process result storage 1403. The process result storage 1403 stores simulation results. The control signal generator 1404 outputs the control signal 211 determined by the control signal determinator 312.

In the test period 401, the simulation result 212 is inputted into the matching degree calculator 309. The simulation results of the normal period 402 stored in the process result storage 1403 and the simulation results of the test period 401 are inputted into the matching degree calculator 309. The matching degree calculator 309 compares the simulation result of the normal period 402 with the simulation result of the test period 401, and calculates the matching degree between them. The sequence for calculating the matching degree is the same as that of the embodiment 1. The calculated matching degree is associated with the current control signal for tests and is stored in the matching degree storage 1406. The test control signal generator 311 generates the control signal for tests as in the embodiment 1. The test timing generator 301 determines which test pattern the test control signal generator 311 will output. When instructed to determine the control signal 211 by the test timing generator 301, the control signal determinator 312 determines the control signal 211 using the matching degree stored in the matching degree storage 1406. After determining the control signal 211, the control signal determinator 312 deletes all matching degrees stored in the matching degree storage 1406.

Figure 15:
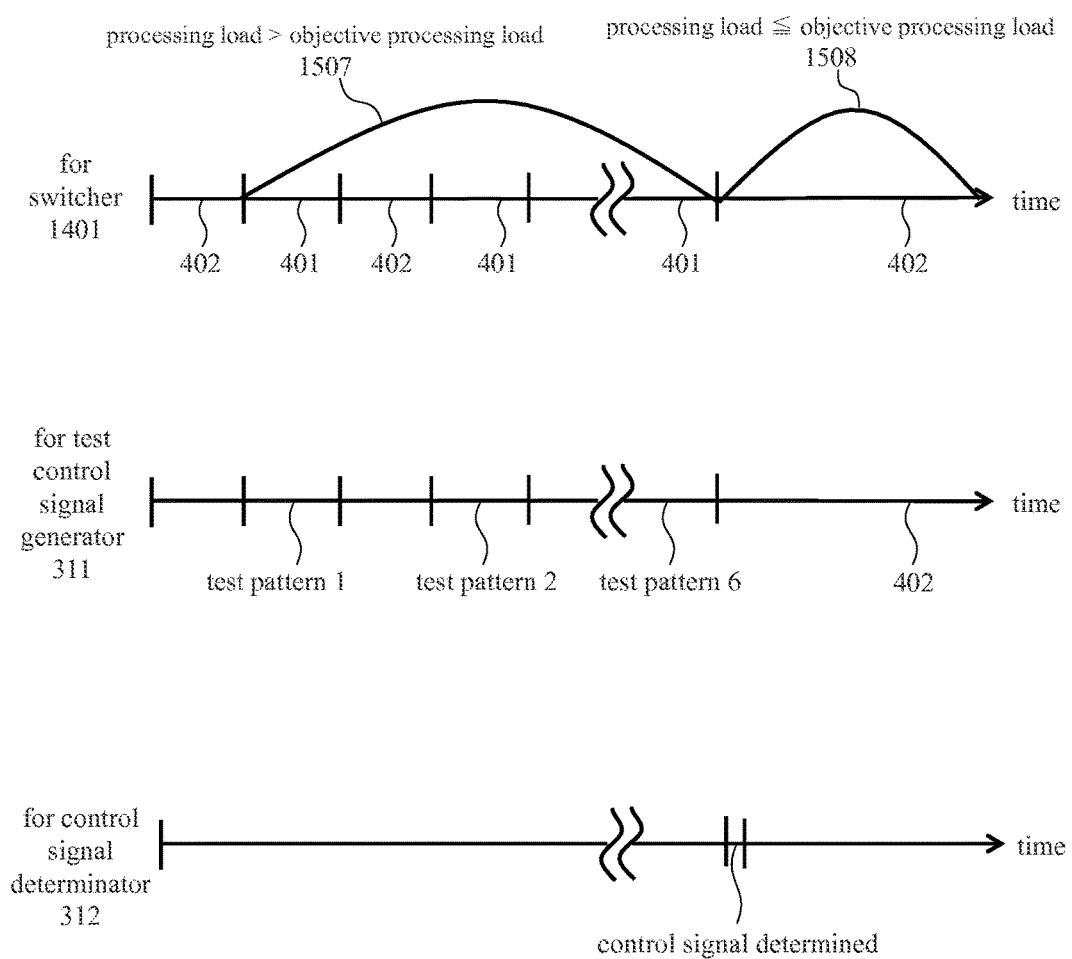
FIG. 15 shows an example of a switching signal generated by a test timing generator 301.

FIG. 15 shows an example of a switching signal generated by the test timing generator 301. This example shows a signal for the switcher 1401, a signal for the test control signal generator 311, and a signal for the control signal determinator 312. The test timing generator 301 compares the processing load 1203 with the objective processing load 206. In a period 1507 where the processing load 1203 is larger than the objective processing load 206, it is necessary to reduce the processing load 1203. Thus a signal to instruct to repeat the normal period 402 and the test period 401 alternatively is outputted as the signal for the switcher 1401. In addition, a signal to sequentially switch the test patterns (test patterns 1-6) used in the test period 401 is outputted as the signal for the test control signal generator 311. The test patterns used in the test period 401 are selected among all test patterns where the sum of preset values of processing loads is lower than that of the current control signal 211. After the test period 401, the test timing generator 301 outputs a signal to instruct to determine the control signal 211 as the signal for the control signal determinator 312. After determining the control signal 211, in the period where the processing load 1203 is at or lower than the objective processing load 206, the test timing generator 301 outputs a signal to perform the normal period 402 toward the switcher 1401.

By generating test timings as above, when the processing load 1203 becomes larger than the objective processing load 206, it is possible to select the control signal 211 with low processing loads to reduce the processing load.

In FIG. 15, an example is shown where the test timing generator 301 instructs to determine the control signal 211 when all selected test patterns have been processed. It is also possible to begin from the test pattern which is close to the sum of processing load of the current control signal 211, and to instruct to determine the control signal 211 when a predetermined number of the test patterns have been completed.

In the examples above, the sequence for reducing the processing load 1203 is described. If the processing load 1203 is much less than the objective processing load 206, the processing load 1203 may be increased. In order to increase the processing load 1203, some of test patterns having large sum value of processing loads are tested among test patterns having sum value of processing loads close to the current control signal 211, and then the test pattern having the lowest matching degree is determined as the control signal 211. By repeating this process until the processing load 1203 becomes close to the objective processing load 206, it is possible to acquire the simulation result while maintaining the processing load close to the objective processing load 206.

In the examples above, an operational example is described where the test period 401 and the normal period 402 are repeated intermittently. When the test period 401 should not be performed, such as when troubles have occurred in the facility, an instruction to stop the test period 401 and to perform the normal period 402 only may be sent to the video monitoring device 200, and the video monitoring device 200 may work according to the instruction.

Embodiment 4

Figure 16:
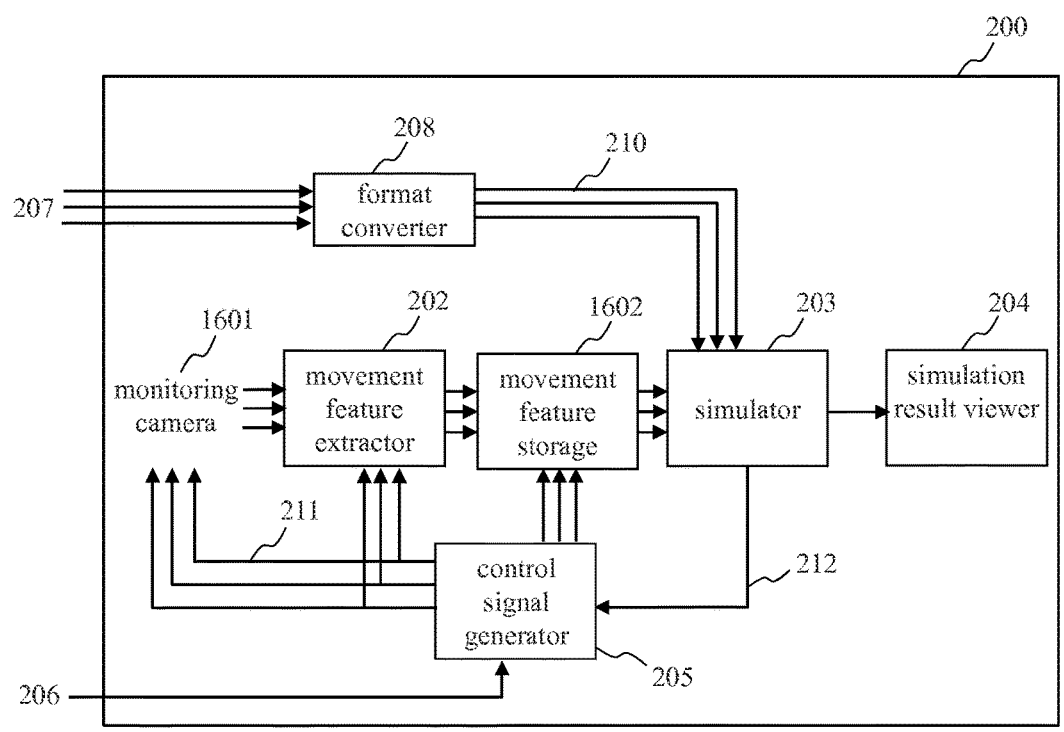
FIG. 16 is a functional block diagram of the video monitoring device 200 according to an embodiment 4.

FIG. 16 is a functional block diagram of the video monitoring device 200 according to an embodiment 4 of the present invention. In the embodiment 4, a configuration example will be described where functional units other than the movement feature extractor 202 are controlled using the control signal 211. The example below adjusts configuration parameters of monitoring cameras using the control signal 211. Other configurations are similar to those of the embodiments 1-3. Thus hereinafter differences will be mainly described.

A monitoring camera 1601 outputs captured images into the movement feature extractor 202. The control signal generator 205 generates the control signal 211 using the schemes described in the embodiments 1-3. If it is possible to reduce the processing load of the movement feature extractor 202 by controlling the monitoring camera 1601 using the control signal 211, the monitoring camera 1601 may be controlled using the control signal 211. For example, if it is desired to decrease the processing frequency of the movement feature extractor 202, the capturing frequency of the monitoring camera 1601 may be reduced. If it is desired to decrease the number of processed pixels of the movement feature extractor 202, the resolution of the monitoring camera 1601 may be reduced. If the control signal 211 instructs to exclude any one of the monitoring cameras 1601 from the process, similar effects can be achieved by such as powering off the camera or turning the orientation of the camera.

The video monitoring device 200 according to the embodiment 4 may include a movement feature storage 1602 in addition to the configuration described in the embodiment 1. The movement feature storage 1602 stores movement features extracted by the movement feature extractor 202. By adjusting the data size of movement features using the control signal 211, it is possible to optimize the storage size for movement features. For example, in addition to the objective processing load 206 (or instead of it), a data size of movement features stored within a certain period is specified. The test pattern generation table 500 or the configuration pattern correspondence table 1300 describes, in addition to reducing the processing load (or instead of it), patterns for decreasing the data size of movement features. The control signal generator 205 generates the control signal 211 according to these values, and outputs the control signal 211 into the movement feature storage 1602. The movement feature storage 1602 reduces, according to the control signal 211, the data size of movement features using methods such as thinning vector data at certain intervals.

Embodiment 5

In an embodiment 5 of the present invention, a method for building the video monitoring system 100 described in the embodiments 1-4 will be described in terms of the sequence for determining camera locations.

Figure 17:
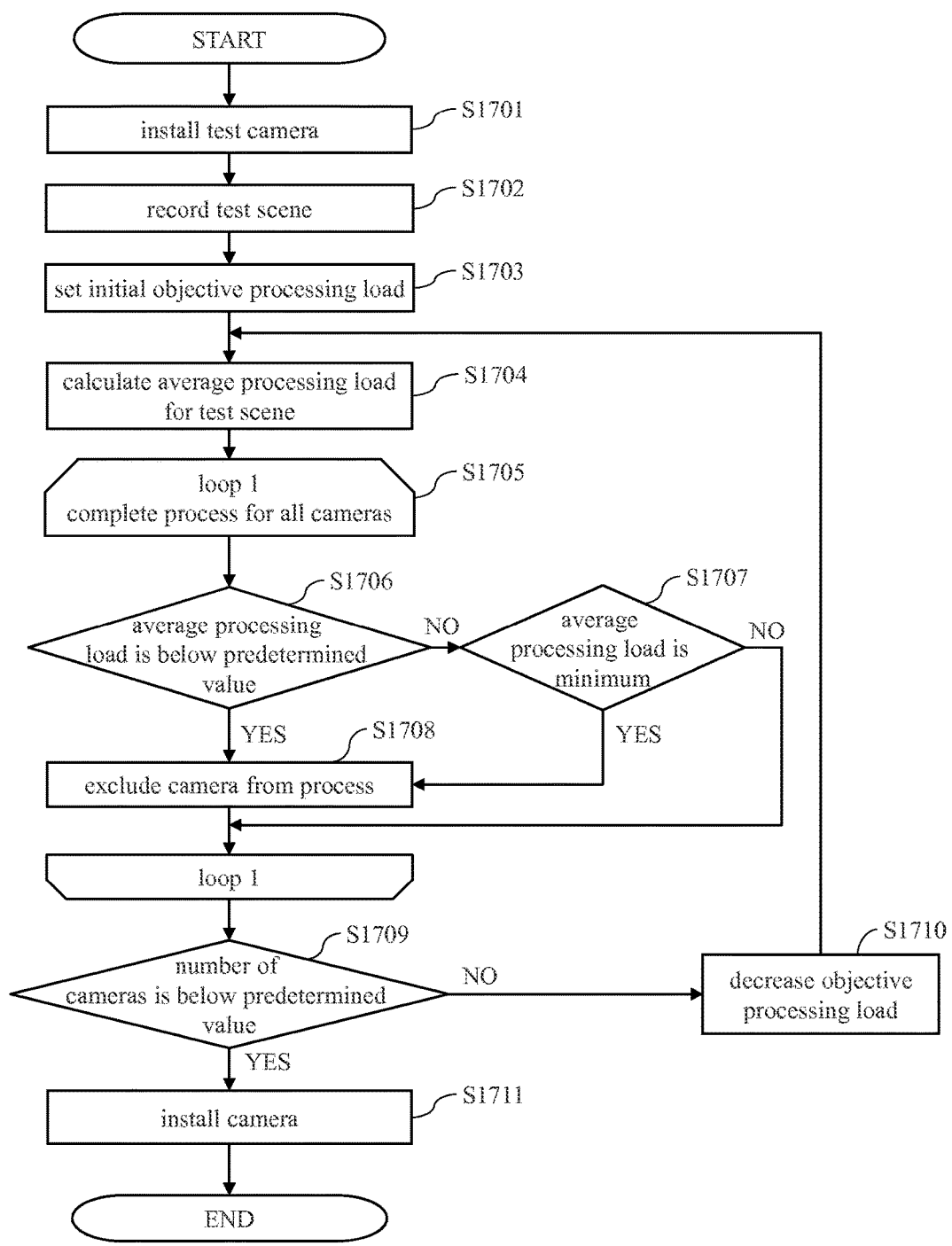
FIG. 17 is a flowchart showing a sequence for building the video monitoring system 100.

FIG. 17 is a flowchart showing a sequence for building the video monitoring system 100. FIG. 17 shows a sequence for determining locations of monitoring cameras when installing the video monitoring system 100 described in the embodiments 1-4 into a facility. When determining the monitoring camera locations, the functions of the video monitoring system 100 described in the embodiments 1-4 are utilized. Hereinafter, each step in FIG. 17 will be described.

(FIG. 17: Steps S1701-S1703)

An administrator building the video monitoring system 100 installs monitoring cameras in the facility at as many locations as possible (S1701). At this time, it is desirable to cover the entire facility by the monitoring cameras. Next, a test scene is recorded for a certain period using each of the installed monitoring cameras (S1702). Next, an initial value of the objective processing load 206 is set (S1703). A processing frequency of image extraction process or electric power consumption of servers may be specified as the objective processing load 206.

(FIG. 17: Steps S1704)

The video monitoring system 100 performs the processes (such as movement feature extraction or simulations) described in the embodiments 1-4 using the configured objective processing load 206 and the test scene. The process load calculator 310 calculates a temporal average of the processing load for each of the camera images 201 related to the test scene. At the time performing this step for the first time, test scenes of all monitoring cameras are used. As described in the subsequent steps, the number of monitoring cameras will be reduced as this flowchart proceeds.

(FIG. 17: Steps S1705)

Steps S1706-S1708 described below are performed for test scenes of all monitoring cameras. An index i is assigned to each of the monitoring cameras. The value of i will be increased as the process loop proceeds.

(FIG. 17: Steps S1706)

It is determined whether the average processing load for camera i calculated in step S1704 is at or below a predetermined value. This determination may be performed by any one of the functional units in the video monitoring system 100 or the administrator may determine by visually checking the numerical values. The determinations in steps S1707 and S1709 may be performed similarly. If the average processing load is at or below the predetermined value, the flowchart proceeds to step S1708. Otherwise the flowchart proceeds to step S1707.

(FIG. 17: Steps S1707)

It is determined whether the average processing load of the camera i calculated in step S1704 is the minimum among all of the camera images 201. If it is the minimum, the flowchart proceeds to step S1708. Otherwise the flowchart proceeds the loop of step S1705.

(FIG. 17: Steps S1708)

The camera which is determined in step S1706 or in S1707 that its average processing load is low may not be frequently used. Thus such camera is excluded from cameras installed in the facility. The cameras excluded in this step will also be excluded in the subsequent process loops.

(FIG. 17: Steps S1709)

It is determined whether the number of cameras that are not excluded in step S1708 reaches at or below a predetermined value (S1709). If not reached, the objective processing load 206 is decreased from the current value (S1710), and the flowchart returns back to S1704 to repeat the same process. If the number of cameras reaches at or below the predetermined value, remaining cameras are installed.

Embodiment 6

Figure 18:
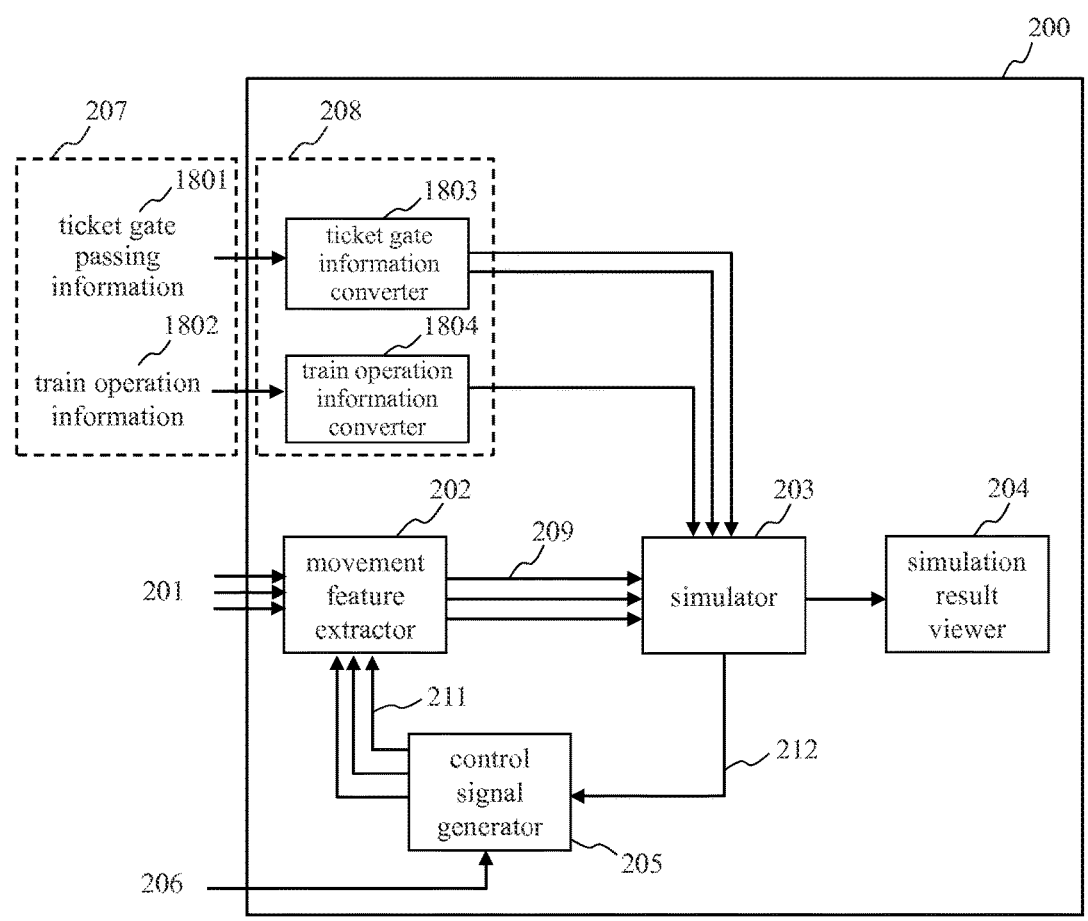
FIG. 18 is a functional block diagram of the video monitoring device 200 according to an embodiment 6.

FIG. 18 is a functional block diagram of the video monitoring device 200 according to an embodiment 6 of the present invention. In the embodiment 6, a configuration example will be described where it is assumed that the video monitoring system 100 described in the embodiments 1-4 operates in a train station. Other configurations are similar to those of the embodiments 1-4. Thus hereinafter differences will be mainly described.

As the sensor information 207, ticket gate passing information 1801 or train operation information 1802 are inputted into the video monitoring device 200. The ticket gate passing information 1801 is information indicating the number of persons passing the ticket gate within a certain period. The train operation information 1802 is information indicating the time table on which operations of trains are currently based. The video monitoring system 100 includes a ticket gate information converter 1803 and a train operation information converter 1804.

The ticket gate information converter 1803 converts the ticket gate passing information 1801 into formats that can be simulated by the simulator 203. For example, if the ticket gate passing information 1801 is information indicating the number of entering and exiting people for each of ticket gates, the location of each ticket gate and the directions of entering and exiting are managed by coordinate values respectively. The locations of each ticket gate and the entering direction are added to the number information of entering people. The locations of each ticket gate and the exiting direction are added to the number information of exiting people.

The train operation information converter 1804 converts the train operation information 1802 into formats that can be simulated by the simulator 203. For example, the time when the train arrives at the platform is estimated from the train operation information 1802, and the number of boarding and exiting people is estimated from data such as average number of boarding and exiting people at the arrival time. The location of train arrival or the location information of exits are added to the estimated number data.

In the embodiment 6, a specific example of the sensor information 207 is described assuming that the video monitoring system 100 is installed in a train station. Sensors that detect other physical states may be installed according to the operational form of the video monitoring system 100, and its detection result may be used as the sensor information 207.

The present invention is not limited to the embodiments, and various modified examples are included. The embodiments are described in detail to describe the present invention in an easily understood manner, and the embodiments are not necessarily limited to the embodiments that include all configurations described above. Part of the configuration of an embodiment can be replaced by the configuration of another embodiment. The configuration of an embodiment can be added to the configuration of another embodiment. Addition, deletion, and replacement of other configurations are also possible for part of the configurations of the embodiments.

The configurations, the functions, the processing units, the processing means, etc., may be realized by hardware such as by designing part or all of the components by an integrated circuit. A processor may interpret and execute programs for realizing the functions to realize the configurations, the functions, etc., by software. Information, such as programs, tables, and files, for realizing the functions can be stored in a recording device, such as a memory, a hard disk, and an SSD (Solid State Drive), or in a recording medium, such as an IC card, an SD card, and a DVD.

DESCRIPTION OF SYMBOLS

100 video monitoring system
200 video monitoring device
202 movement feature extractor
203 simulator
204 simulation result viewer
205 control signal generator
208 format converter
500 test pattern generation table
1300 configuration pattern correspondence table

What is claimed is:
1. A video monitoring system comprising:
an analyzer process that analyzes a movement of a moving object in a video captured by multiple of cameras;
a simulator process that simulates, according to an analysis result by the analyzer, a flow of the moving object in an area captured by the multiple of cameras;
a control signal generator process that generates a control signal for switching a processing scheme used by the analyzer when performing the analysis according to a simulation result by the simulator; and
a pattern table that describes a combination pattern of processing schemes used by the analyzer when analyzing the video captured by each of the cameras,
wherein the combination pattern is configured to indicate a ratio of (a) a processing load when the analyzer performs the analysis with a given processing scheme having a given processing load, with respect to (b) a processing load when the processing scheme with a highest processing load is used,
wherein the control signal generator (a) calculates, from the simulation result, a parameter that is correlated with a processing load when the analyzer acquires the analysis result, (b) specifies the combination pattern corresponding to the simulation result according to the calculated parameter, and (c) generates the control signal corresponding to the specified combination pattern,
and wherein the analyzer switches the processing scheme according to the control signal generated by the control signal generator.
2. The video monitoring system according to claim 1,
wherein the simulator outputs a first simulation result acquired by performing the simulation based on the analysis result acquired by the analyzer according to the combination pattern,
wherein the simulator outputs a second simulation result acquired by performing the simulation based on the analysis result acquired by the analyzer using a second processing scheme having a processing load of the analyzer which is higher than that defined by the combination pattern,
wherein the pattern table describes multiple combination patterns,
and wherein the control signal generator acquires the first simulation result for multiple of the combination patterns, calculates a matching degree between the first simulation result and the second simulation result as the parameter, and generates the control signal that instructs the analyzer to use the combination pattern corresponding to the first simulation result having a highest one of the matching degree.
3. The video monitoring system according to claim 2,
the video monitoring system further comprising a control signal determinator process that determines a control signal to be employed among multiple of the control signals generated by the control signal generator,
wherein the control signal generator generates the control signal that instructs to perform the analysis using each of one or more of the combination patterns,
wherein the simulator performs the simulation according to the analysis result corresponding to each of the control signals generated by the control signal generator,
and wherein the control signal determinator employs a control signal among multiple of the control signals generated by the control signal generator having a highest one of the matching degree.
4. The video monitoring system according to claim 2,
wherein the control signal determinator acquires an objective processing load which is an objective value of the processing load of the analyzer,
and wherein the control signal determinator specifies one or more of the control signals that achieves the processing load at or below the objective processing load, and employs a control signal among the specified multiple control signals having a highest one of the matching degree.

5. The video monitoring system according to claim 1,
the video monitoring system further comprising map data that describes map information of the area captured by the multiple cameras,
wherein the control signal generator calculates, as the parameter, a numerical value that is a numerical value related to the moving object at a point on the map data and that decreases a processing load when the analyzer acquires the analysis result,
and wherein the control signal generator specifies the point where the processing load is predicted to be decreased according to the parameter and the map data, and decreases the processing load at the point according to the prediction.

6. The video monitoring system according to claim 5,
wherein the pattern table describes multiple relationship patterns between the parameter and the combination pattern,
wherein the control signal generator acquires an objective processing load which is an objective value of the processing load of the analyzer,
and wherein if the processing load does not reach at or below the objective processing load even by generating the control signal using any one of the relationship pattern described in the pattern table, the control signal generator generates the control signal that instructs to cumulatively apply other one of the relationship pattern.

7. The video monitoring system according to claim 6,
wherein if the parameter does not match with any one of the relationship pattern described in the pattern table, the control signal generator generates the control signal that instructs to reduce the processing load for a predetermined one of the camera regardless of the relationship pattern.

8. The video monitoring system according to claim 3,
the control signal generator and the control signal determinator intermittently repeat an operation where the control signal generator generates the control signal and where the control signal determinator determines the control signal to be employed.

9. The video monitoring system according to claim 1,
wherein the control signal generator generates the control signal that instructs the camera to reduce the processing load according to the combination pattern,
and wherein the camera reduces the processing load according to the control signal.

10. The video monitoring system according to claim 1,
the video monitoring system further comprising a storage unit that stores the analysis result by the analyzer in a storage device,
wherein the control signal generator generates the control signal that instructs the storage unit to reduce a data size of the analysis result according to the combination pattern,
and wherein the storage unit reduces the data size of the analysis result according to the control signal.

11. The video monitoring system according to claim 1,
the video monitoring system further comprising a sensor that detects a physical state of the area captured by the camera or of a peripheral area of the area,
wherein the simulator performs the simulation using the physical state detected by the sensor.

12. A video monitoring method comprising:
a step of reading a pattern table that describes a combination pattern of processing schemes used when analyzing a movement of a moving object in a video captured by multiple of cameras;
an analysis step of analyzing a movement of a moving object in a video captured by each of the multiple cameras;
a simulation step of simulating, according to an analysis result in the analysis step, a flow of the moving object in an area captured by the multiple of cameras; and
a control signal generation step of generating a control signal for switching a processing scheme used in the analysis step when performing the analysis according to a simulation result in the simulation step,
wherein the combination pattern is configured to indicate a ratio of (a) a processing load when performing the analysis in the analysis step with a given processing scheme with a given processing load, with respect to (b) a processing load when the processing scheme with a highest processing load is used,
wherein in the control signal generation step, (a) calculating, from the simulation result, a parameter that is correlated with a processing load when acquiring the analysis result in the analysis step, (b) specifying the combination pattern corresponding to the simulation result according to the calculated parameter, and (c) generating the control signal corresponding to the specified combination pattern,
and wherein the analysis step switching the processing scheme according to the control signal generated in the control signal generation step.

13. A method for building the video monitoring system according to claim 1, comprising:
a step of installing multiple cameras in the region;
an analysis step where the analyzer analyzes a movement of a moving object in a video captured by the camera;
a simulation step where the simulator simulates a flow of the moving object in the area captured by the multiple cameras according to an analysis result by the analyzer; and
a removal step removing, from the area, the camera causing a processing load of the analyzer and the simulator lower than a predetermined value, or the camera causing a lowest processing load of the analyzer and the simulator among the multiple cameras,
wherein the analysis step, the simulation step, and the removal step are repeated until a number of the cameras installed in the area reaches at or lower than an objective number of camera.

* * * * *